United States Patent [19]

Kawamoto et al.

[11] Patent Number: 4,464,145
[45] Date of Patent: Aug. 7, 1984

[54] BELT TYPE STEPLESS SHIFTER

[75] Inventors: Mutsumi Kawamoto, Nagoya; Shiro Sakakibara, Toyokawa, both of Japan

[73] Assignee: Aisin-Warner Kabushiki Kaisha, Anjo, Japan

[21] Appl. No.: 212,553

[22] Filed: Dec. 3, 1980

[30] Foreign Application Priority Data

Dec. 3, 1979 [JP] Japan ............... 54-157226

[51] Int. Cl.³ ............ F16H 55/52; F01B 31/00; F01B 7/00
[52] U.S. Cl. .................. 474/28; 92/107; 92/152; 474/18
[58] Field of Search ............ 474/28, 18; 92/108, 92/107, 65, 152

[56] References Cited
U.S. PATENT DOCUMENTS 3,557,640  1/1971  Hendriks et al. ............ 474/28 X
4,143,558  3/1979  Van Deursen et al. ......... 474/28
4,229,988  10/1980 Rattunde .................... 474/28
4,272,999  6/1981  Perry ....................... 74/207
4,292,031  9/1981  Rattunde ................. 474/28 X

FOREIGN PATENT DOCUMENTS 2652938  5/1978  Fed. Rep. of Germany .

Primary Examiner—Lawrence J. Staab
Assistant Examiner—Michael D. Bednarek
Attorney, Agent, or Firm—Cooper, Dunham, Clark, Griffin & Moran

[57] ABSTRACT

In a belt type stepless shifter, movable flanges of pulleys are driven by hydraulic cylinders, and each of the cylinders is provided with a plurality of pressure carrying surfaces disposed in the axial direction, thereby a great amount of torque can be transmitted at low hydraulic pressure or at a small outer diameter. The belt type stepless shifter is adapted for use in a transmission apparatus of vehicles.

12 Claims, 4 Drawing Figures

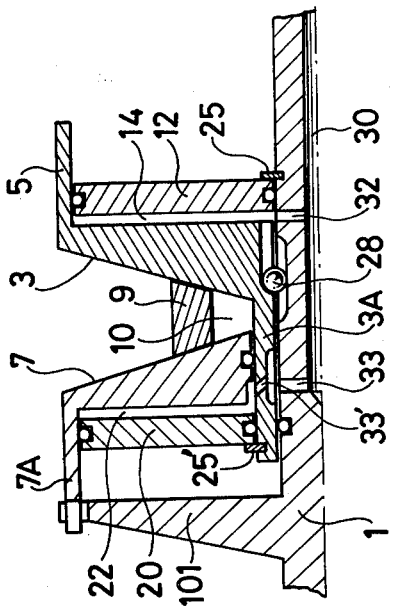
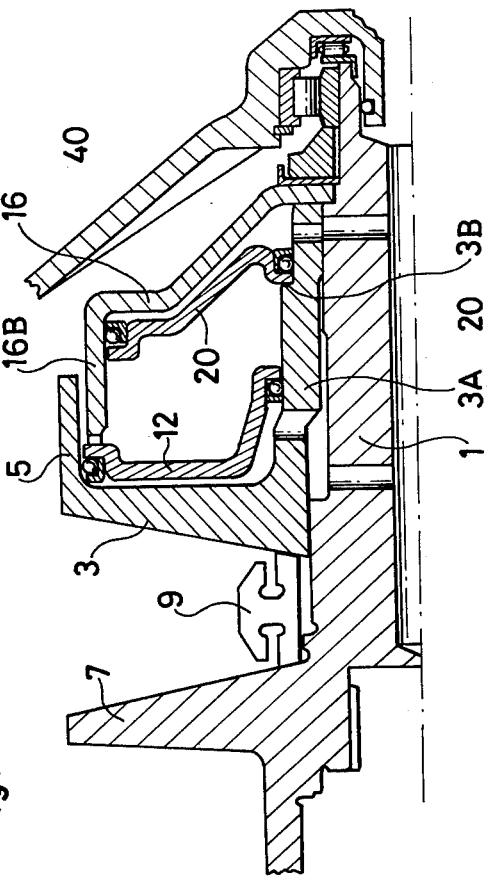
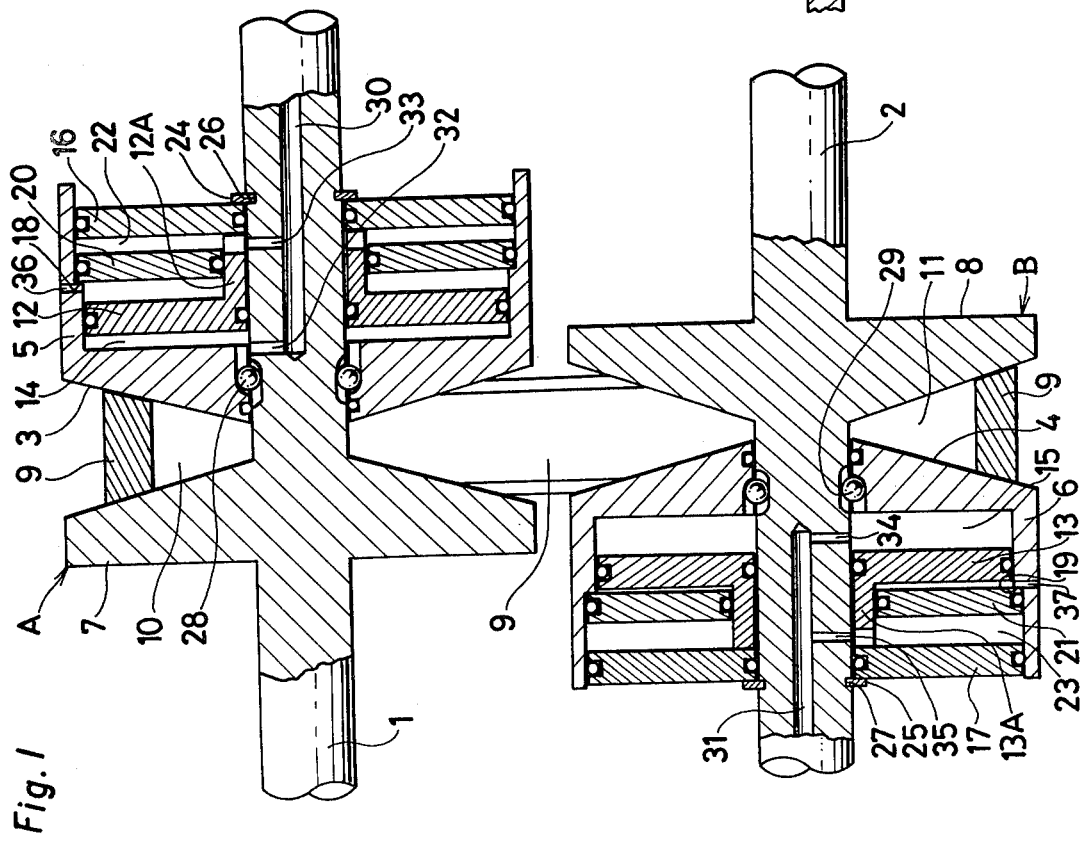

BELT TYPE STEPLESS SHIFTER

BACKGROUND OF THE INVENTION

1. Field of the Invention

The present invention relates to a belt type stepless shifter for vehicles comprising a pair of pulleys with the effective diameter variable and a driving V-belt between these pulleys, and more particularly to an improved stepless shifter which can increase the amount of transmitted torque.

2. Description of the Prior Art

A belt type stepless shifter is known which comprises pulleys mounted on input and output shafts disposed in parallel, each of an said pulleys including a movable flange axially driven by hydraulic servo means composed of annular cylinder and piston, disposed on the concentric axis to the shaft, and a stationary flange in opposition to the movable flange so as to constitute a V-shaped space for a V-belt between opposite surfaces of both flanges, and a V-belt connecting these pulleys, thereby regulating the revolution radius of the V-belt is regulated by supplying or exhausting of oil in the annular cylinder. In order to increase the amount of torque transmitted between the input and output shafts in such a belt type stepless shifter and to prevent slippage of the belt, hydraulic pressure supplied to the annular oil chamber of pulleys must be increased, or the pressure carrying area of the movable cylinder or piston connected to the movable flange must be increased. In general, increase of the hydraulic pressure requires increase of the driving power of the oil pump, and increase of the pressure carrying area requires increase of the outer diameter of the shifter.

SUMMARY OF THE INVENTION

An object of the present invention is to provide a belt type stepless shifter adapted for use in a transmission apparatus of vehicles.

Another object of the present invention is to provide a belt type stepless shifter in which hydraulic pressure for pushing a movable flange acts on a plurality of pressure carrying surfaces disposed along the axial direction, thereby transmitting a great amount of torque at low pumping pressure or small outer diameter.

BRIEF DESCRIPTION OF THE DRAWINGS

FIG. 1 is a sectional view of a V-belt type stepless shifter according to an embodiment of an the present invention;

FIG. 2 is a sectional view of essential part of a V-belt type stepless shifter according to another embodiment of the invention;

FIG. 4 is a sectional view of essential part of a V-belt type stepless shifter according to a further embodiment of the invention.

DETAILED DESCRIPTION OF PREFERRED EMBODIMENTS

Figure 3:
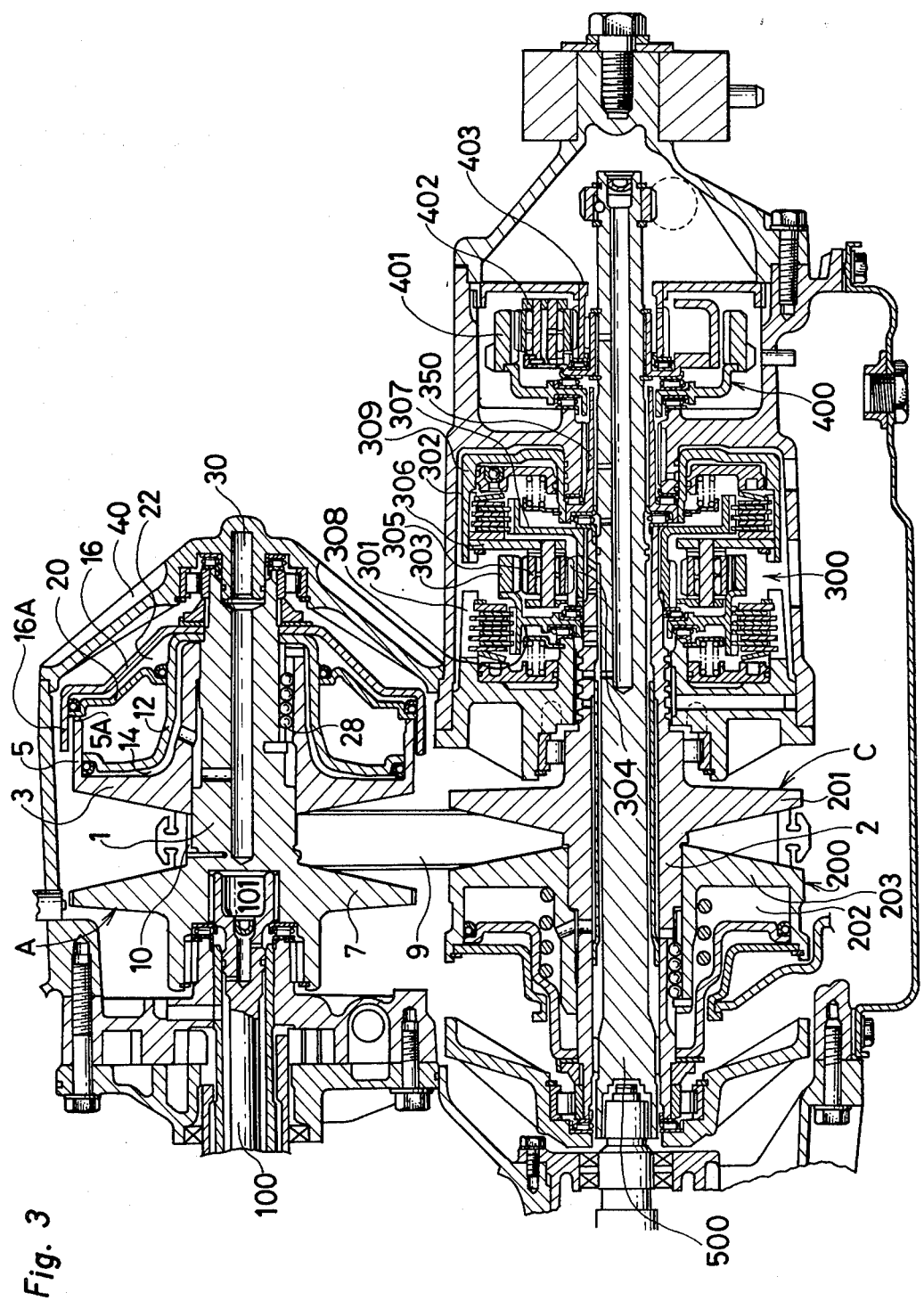
FIG. 3 is a sectional view of a V-belt type stepless shifter applied to a front-wheel drive vehicle.

The present invention is now described in more detail with reference to preferred embodiments thereof shown in the accompanying drawings.

A driving input shaft 1 and an output shaft 2 are disposed in parallel to each other. Movable flanges 3 and 4 are slidably fitted respectively to the input shaft 1 and the output shaft 2. Cylinders 5 and 6, arranged along the concentric axis to the input shaft 1 and the output shaft 2, are constituted integrally with the movable flange 3 and 4 as side walls. Stationary flanges 7 and 8 are integrally constituted respectively with the input shaft 1 and the output shaft 2. The movable flange 3 together with the stationary flange 7 constitutes a V-shaped space 10 to receive a V-belt 9; the movable flange 4 together with the stationary flange 8 constitutes another V-shaped space 11 for the V-belt 9. Pulleys A and B are constituted by these movable and stationary flanges. First stationary walls 12 and 13 are inserted respectively in the cylinders 5 and 6. First oil chambers 14 and 15 in the cylinders 5 and 6 are constituted respectively between the movable flange 3 as a side wall of the cylinder and the first stationary wall 12 and between the movable flange 4 and the first stationary wall 13. Rims 12A and 13A, integral with the first stationary walls 12 and 13, contact with the input shaft 1 and the output shaft 2 respectively. Second stationary walls 16 and 17 are arranged in the cylinders 5 and 6, and between the first wall 12 and the second wall 16 and between the first wall 13 and the second wall 17 are inserted respectively pressure carrying plates 20 and 21, each slidable along the shaft through the rims 12A and 13A. Stepped portions 18 and 19 are constituted respectively at the inner circumferential walls of the cylinders 5 and 6 and engage with the pressure carrying plates 20 and 21. Second oil chambers 22 and 23 are constituted respectively between the second stationary wall 16 and the pressure carrying plate 20 and between the second stationary wall 17 and the pressure carrying plate 21. Clips 24 and 25, which are fitted respectively to grooves 26 and 27 provided on the input shaft 1 and the output shaft 2, stop the second stationary walls 16 and 17 directly and the first stationary walls 12 and 13 through the rims 12A and 13A. Steel balls 28 are inserted in grooves provided on both sliding surfaces of the input shaft 1 and the movable flange 3 and serve to prevent the relative rotation between the movable flange 3 and the input shaft 1. Steel balls 29 are similarly inserted in grooves on the input shaft 2 and the movable flange 4. Oil passages 30 and 31 are formed in the axial direction of input shaft 1 and the output shaft 2. The oil passage 30 is in communication with the first oil chamber 14 through a radial hole 32 and with the second oil chamber 22 through a radial hole 33; the oil passage 31 is in communication with the first oil chamber 15 through a radial hole 34 and with the second oil chamber 23 through a radial hole 35. Vent holes 36 and 37 are provided on the cylinders 5 and 6. Width of the V-shaped spaces 10 and 11 may be regulated by driving of the movable flange 3 and 4 with hydraulic servo means including the first oil chambers 14 and 15 and the second oil chambers 22 and 23, so that the revolution radius of the V-belt contacting with the pulleys A and B may be regulated, resulting in stepless transmission. The amount of torque transmitted between the input and output shafts is determined by contact pressure and contact area in the pulleys A and B, the contact pressure corresponding to the product of the hydraulic pressure and the pressure carrying area in the first and second oil chambers pushing the movable flanges 3 and 4. Accordingly, the pulleys A and B with the movable flanges pushed by the two oil chambers as described in the above embodiment can transmit a great amount of torque using a cylinder of small outer diameter or low level hydraulic pressure.

Referring to FIG. 2, another embodiment of the invention will be described. In addition to like components identified by like reference numerals in FIG. 1, the embodiment includes a sleeve 3A integral with the movable flange 3 and slidably inserted between the input shaft 1 and the stationary flange 7, a cylinder 7A integral with the stationary flange 7, and a collar 101 projecting from the input shaft 1 and connected to the end of the cylinder 7A for engaging the stationary flange 7 with the input shaft 1 through the cylinder 7A. In the embodiment, the pressure carrying plate 20 is engaged with the sleeve 3A through a clip 25' and slidably fitted to the cylinder 7A. The first oil chamber 14 is constituted between the movable flange 3 and the first stationary wall 12, and the second oil chamber 22 between the stationary flange 7 and the pressure carrying plate 20. The radial hole 33 is in communication with the second oil chamber 22 through an oil passage 33'.

In this embodiment, the movable flange 3 is driven by hydraulic servo means including two oil chambers, the first chamber 14 and the second chamber 22 disposed in series along the axial direction, and two pressure carrying surfaces are provided at the movable flange 3 and the pressure carrying plate 20.

Referring to FIG. 3, another more practical embodiment of the invention will be described in which a belt type stepless shifter is applied to a transmission apparatus of a front-wheel drive vehicle. The input shaft 1 in the embodiment is fitted through a spline 101 to an input transmission shaft 100 which is connected to the engine output shaft through clutches, fluid couplings or torque convertors. The pressure carrying plate 20 is engaged with the end 5A of the cylinder 5 by means of the pulley A and a cylinder 16A integral with the stationary wall 16 is fitted to the outside of the cylinder 5. The construction as above described permits the diameter of the pressure carrying plate 20, i.e., the pressure carrying area, to increase. A conventional pulley C, including a stationary flange 201 and a movable flange 203 driven by one oil chamber 202, is mounted on the output shaft 2 so that relative rotation is possible on the concentric axis. The pulley C is connected to an input hub 307 of a forward clutch 302 secured to an intermediate shaft 350 as reduction gear input and a sun gear 304 as input of a rear planetary gear 300. A ring gear 303 of the rear planetary gear 300 is secured to a hub 308 of a rear brake 301, and a carrier 306 as output of the rear planetary gear is connected to the intermediate shaft 350 through a forward clutch cylinder 309.

The intermediate shaft 350 is connected to a ring gear 401 as input of a reduction gear 400, a reduction planetary carrier 402 is fitted to an output shaft 500 through a spline, and a sun gear 403 is secured to the gear case. The output shaft 500 is connected to the axle through a differential gear. In forward drive, the clutch 302 is engaged and the brake 301 is released, thereby a reduction ratio of 2.0–0.5 is provided in a belt type stepless shifter and is inputted to a reduction gear without using a rear planetary gear, and a reduction ratio of about 1.5 is provided in the reduction gear mechanism 400. In rear drive the clutch 302 is released and the brake 301 is engaged, the carrier 306 as output is reversed with respect to the sun gear 304 as input because of the double planetary mechanism and is inputted to the reduction gear 400.

A further embodiment shown in FIG. 4 includes a sleeve 3A integral with the movable flange 3 and slidable to the input shaft 1, and a cylinder 16B integral with the second stationary wall 16 and fitted to the cylinder 5, wherein the first stationary wall 12 is engaged with the input shaft 1 through the second stationary wall 16 by connecting the outer periphery of the wall 12 to the end of the cylinder 16B and slidable with the sleeve 3A, and the pressure carrying plate 20 is engaged with a stepped portion 3B disposed on the sleeve 3A and slidably fitted to the cylinder 16B.

Although the above mentioned embodiments disclose the movable or stationary flange integral with and constituting the side wall of the cylinder in hydraulic servo means, the movable or stationary flange and the cylinder may be separately constituted, or other hydraulic servo means for driving the movable flange may be provided with a movable piston inserted in the cylinder secured to the shaft, said movable piston being integral with the movable flange or connected as a separate piece to the flange and provided with a pressure carrying surface. Hydraulic servo means may be provided with two or more oil chambers resulting in two or more pressure carrying surfaces, although increase of the number of oil chambers involves complication of the structure.

As above descrived, a belt type stepless shifter of the present invention comprises hydraulic servo means driving a movable flange and having a plurality of oil chambers disposed in series along the axial direction, and a plurality of pressure carrying surfaces pushing the movable flange, thereby a great amount of torque can be transmitted even at the small outer diameter and the working hydraulic pressure of low level.

What is claimed is:
1. A belt-type stepless shifter comprising:
 (a) an input shaft,
 (b) an output shaft diposed in parallel to said input shaft,
 (c) a primary pulley comprising a stationary flange disposed in concentric relation to said input shaft and a movable flange slidably disposed relative to said input shaft,
 (d) a secondary pulley comprising a stationary flange disposed in concentric relation relative to said output shaft and a movable flange slidably disposed in relation to said output shaft,
 (e) A belt positioned on said primary pulley and said secondary pulley wherein the rotation speed ratio between said input shaft and output shaft can be converted by changing the position of the effective driving radius relative to said pulleys,
 (f) a hydraulic servo means for moving at least one of said movable flanges of said pulleys, said hydraulic servo means having plural oil chambers arranged in series capable of moving said movable flange in the same direction, at least one of said oil chambers having a primary piston connected to said input shaft or said output shaft, and a movable cylinder which moves slidably on an axis together with said movable flange and another of said oil chambers comprising a stationary cylinder having an axially extending sleeve connected to said input shaft or output shaft, and a secondary piston which moves slidably on an axis together with said movable flange, wherein said movable cylinder moves slidably relative to and overlaps said stationary cylinder in the direction of said axis.

2. A belt-type stepless shifter in accordance with claim 1, wherein said movable cylinder is united with said movable flange.

3. A belt-type stepless shifter in accordance with claim 1, wherein said primary piston is connected to said input shaft or output shaft and slidably interposed to the inside of said movable cylinder.

4. A belt-type stepless shifter in accordance with claim 2, wherein said primary piston has an edge which cooperates with an inside sleeve of said movable flange.

5. A belt-type stepless shifter in accordance with claim 1, wherein said secondary piston is connected to an outside sleeve of said movable cylinder and interposed slidably to said stationary cylinder.

6. A belt-type stepless shifter in accordance with claim 5, wherein said secondary piston is interposed slidably between said primary piston and said stationary cylinder.

7. A belt-type stepless shifter in accordance with claim 1, wherein said primary piston is connected to said input shaft or output shaft through said stationary cylinder and disposed in an inner part of said moveable cylinder.

8. A belt-type stepless shifter in accordance with claim 7, wherein said primary piston is connected to the edge of said stationary cylinder.

9. A belt-type stepless shifter in accordance with claim 7, wherein said primary piston has an outer portion slidably cooperating with said inner part of said movable cylinder; and an inner portion slidably cooperating with an inside sleeve of said movable flange.

10. A belt-type stepless shifter in accordance with claim 9, wherein said secondary piston has an inner portion connected to the inside sleeve of said movable flange and an outer portion slidably disposed in an inner part of said stationary cylinder.

11. A belt-type stepless shifter in accordance with claim 6, wherein oil pressure is provided through an oil passage formed on said input shaft or output shaft to an oil chamber comprising said movable cylinder and said primary piston through a hole formed on a sleeve of said movable flange, and said oil pressure is given to an oil chamber comprising said stationary cylinder and said secondary piston through a hole formed on said primary piston.

12. A belt-type stepless shifter in accordance with claim 1, wherein oil pressure is provided through an oil passage formed on said input shaft or said output shaft to a chamber comprising said movable cylinder and said primary piston and an oil chamber comprising said stationary cylinder and said piston, through a hole formed respectively on an inside sleeve of said movable flange.

* * * * *